US012599465B2

(12) United States Patent
Köhrer

(10) Patent No.: US 12,599,465 B2
(45) Date of Patent: Apr. 14, 2026

(54) TOOTH ROOT CANAL IRRIGATION ASSEMBLY FOR CLEANING TOOTH ROOT CANALS

(71) Applicant: Dennis Manuel Köhrer, Neuss (DE)

(72) Inventor: Dennis Manuel Köhrer, Neuss (DE)

( * ) Notice: Subject to any disclaimer, the term of this patent is extended or adjusted under 35 U.S.C. 154(b) by 416 days.

(21) Appl. No.: 18/008,918

(22) PCT Filed: Jun. 17, 2021

(86) PCT No.: PCT/EP2021/066397
§ 371 (c)(1),
(2) Date: Dec. 7, 2022

(87) PCT Pub. No.: WO2021/255162
PCT Pub. Date: Dec. 23, 2021

(65) Prior Publication Data
US 2023/0233297 A1 Jul. 27, 2023

(30) Foreign Application Priority Data
Jun. 17, 2020 (DE) .......................... 102020116029.1

(51) Int. Cl.
*A61C 17/02* (2006.01)
(52) U.S. Cl.
CPC ................................. *A61C 17/0208* (2013.01)
(58) Field of Classification Search
CPC ............ A61C 17/0202; A61C 17/0208; A61C 17/005; A61C 5/40
See application file for complete search history.

(56) References Cited

U.S. PATENT DOCUMENTS 5,490,779 A 2/1996 Malmin
8,388,345 B2 3/2013 Ruddle
(Continued)

FOREIGN PATENT DOCUMENTS

CN 105411711 A * 3/2016 ......... A61C 17/0208
WO WO2011136798 A1 11/2011
(Continued)

OTHER PUBLICATIONS

Pablo Castelo-baz (Scientific Report) [online]. Retrieved from the Internet: https://www.nature.com/articles/s41598-021-90430-0 (Year: 2021).*
(Continued)

*Primary Examiner* — Eric J Rosen
*Assistant Examiner* — Luis Ruiz Martin
(74) *Attorney, Agent, or Firm* — CALDERON SAFRAN & WRIGHT P.C.

(57) ABSTRACT
A root canal irrigation assembly, comprising a vacuum device, a suction element having an elongate suction tip, and a sonic device having a sonic handpiece for introducing sonic vibrations into the suction element and thus causing the suction tip to vibrate, wherein the rear end of the suction element is connected to the vacuum device such that an irrigation fluid containing tissue residues and/or bacteria can be suctioned out of a root canal. The suction element comprises an internal vibrator which is held in the suction tip and projects out of the front end thereof, wherein the suction tip and the internal vibrator are interconnected at their rear ends, wherein the suction tip is resiliently formed and dimensioned such that, when the suction tip is introduced into a root canal, the suction tip sealingly closes the root canal in the region of the root canal wall.

14 Claims, 13 Drawing Sheets

(56)                 References Cited

U.S. PATENT DOCUMENTS

| | | | |
|---|---|---|---|
| 2002/0142260 A1* | 10/2002 | Pond ................. | A61C 17/0202 433/91 |
| 2008/0044789 A1 | 2/2008 | Johnson | |
| 2010/0092922 A1* | 4/2010 | Ruddle ................... | A61C 5/40 433/216 |
| 2014/0295370 A1* | 10/2014 | Balson .............. | A61C 17/0208 433/32 |
| 2016/0067023 A1* | 3/2016 | Castelo Baz ...... | A61C 17/0208 433/81 |
| 2018/0153644 A1 | 6/2018 | Bosisio et al. | |

FOREIGN PATENT DOCUMENTS

| | | |
|---|---|---|
| WO | WO2017011507 A1 | 1/2017 |
| WO | WO2017138018 A1 | 8/2017 |

OTHER PUBLICATIONS

Zhao Translation (Year: 2016).*

* cited by examiner

TOOTH ROOT CANAL IRRIGATION ASSEMBLY FOR CLEANING TOOTH ROOT CANALS

CROSS-REFERENCE TO RELATED APPLICATIONS AND CLAIM TO PRIORITY

This application is a national stage application of International Application No. PCT/EP2021/066397 filed Jun. 17, 2021, which claims priority to German Patent Application No. 10 2020 116 029.1 filed Jun. 17, 2020, the disclosures of which are incorporated herein by reference and to which priority is claimed.

FIELD OF THE INVENTION

The present invention relates to a dental root canal irrigation arrangement for cleaning dental root canals of a patient, having a vacuum device, a suction element with an elongated suction tip which is at least partially made of a flexible material and is positioned at a front end of the suction element, a suction channel being formed in the suction element, which suction channel, starting from the rear end of the suction element, extends in the direction of its front end into the suction tip, wherein the suction tip has at least one suction opening, and the rear end of the suction element is connected to the vacuum device via a line, in particular a connecting hose, so that irrigation liquid with tissue residues and/or bacteria contained therein can be sucked by means of a vacuum generated by the vacuum device via the suction openings into the suction channel and via the latter to the vacuum device.

In addition, the invention relates to a suction element for sucking irrigation liquid with tissue residues and/or bacteria contained therein from a dental root canal of a patient, having an elongated suction tip which consists at least partially of a flexible material, the suction element having an suction channel which, starting from the rear end of the suction element, extends in the direction of its front end into the suction tip, and the suction tip having at least one suction opening which opens into the suction channel.

Finally, the invention relates to a method for cleaning dental root canals of a patient, in which an irrigation liquid is supplied to a dental root canal to be cleaned and this is sucked off with tissue residues contained therein and/or via a suction element with an elongated suction tip, which consists at least partially of a flexible material and is positioned at a front end of the suction element, by means of a vacuum device.

BACKGROUND OF THE INVENTION

Dentistry includes a variety of treatment methods, including endodontic methods for treating the diseased interior of the tooth, such as root canal treatment. Root canal treatment can be used to preserve a tooth whose pulp is severely inflamed or dead. In this process, the tooth root canal undergoes a cleaning process in which the infected tissue located inside the tooth root canal is removed. In particular, the infected root dentin surrounding the root canal is removed by filing it out, widening the tooth root canal. Special endodontic instruments such as endodontic files or endodontic drills are used for this purpose. During the cleaning process, the root canal is repeatedly rinsed with an irrigation solution.

The classical cleaning methods are based on the problem that a large part of the branched root canal system eludes mechanical and chemical cleaning due to its anatomical complexity.

An arrangement for cleaning a root canal is known from U.S. Pat. No. 8,388,345 B2, which is designed to counter these problems. This comprises a suction element with an elongated suction tip, which is at least partially made of a non-metallic flexible material and is positioned at a front end of the suction element. A suction channel is formed in the suction element, which extends from the rear end of the suction element in the direction of its front end into the suction tip. A plurality of suction openings distributed along its circumference are formed in the suction tip, which penetrate the wall of the suction tip starting from its outer lateral surface and open into the suction channel. The suction element can be connected to a vacuum device in order to draw rinsing liquid with bacteria and tissue residues contained therein from a tooth root canal to be cleaned into the suction channel and via this to the vacuum device. A driver can also be connected to the rear end of the suction element, via which the suction tip can be made to vibrate in order to activate the rinsing agent present in the tooth root canal and thus support the cleaning process.

SUMMARY OF THE INVENTION

The task of the invention is to provide a dental root canal irrigation arrangement, in particular a sonic-activated tooth root canal irrigation arrangement, with which the cleaning process of a tooth root canal can be optimized and, in particular, carried out continuously. Furthermore, a suction element and a holder for such a tooth root canal irrigation arrangement are to be provided.

This task is solved in a dental root canal irrigation arrangement and a suction element of the aforementioned type according to a first aspect of the invention in that the suction element has an inner oscillator which is held in the suction tip and projects from its front end, the suction tip and the inner oscillator being connected to one another at their rear end and/or in that the suction tip is designed and dimensioned elastically in such a way that, when the suction tip is introduced into a tooth root canal, it seals the latter in the region of the tooth root canal wall.

It has been shown that the irrigation effect can be further improved by designing the suction tip according to the invention. For this purpose, a suction tip is made of a relatively soft and elastic material, in particular a corresponding plastic material such as PE or PA, which comes into contact with the tooth root canal wall from a certain insertion depth when the suction element is inserted and thus seals the tooth root canal between the tooth root canal wall and the suction tip. As a result of this sealing, a negative pressure is created in the tooth root canal by the action of the negative pressure device, which drops again abruptly when the suction element is pulled out of the tooth root canal again. The shock wave thus generated and the rapid expansion and collapse of the air bubbles contained in the dental root canal and the rinsing solution therein support the cleaning of the tooth root canal and help to loosen and remove the tissue and debris from the mechanically inaccessible areas of the tooth root canal system.

Accordingly, the method for cleaning tooth root canals of a patient of the type mentioned at the beginning is characterized in that such a suction tip is used, which is elastically designed and dimensioned in such a way that, when the suction tip is introduced into the tooth root canal, it seals the dental root canal in the region of the dental root canal, in order to generate a negative pressure in the tooth root canal, and then the suction tip is repeatedly moved back and forth in the dental root canal in order to reopen the dental root canal in the region of the dental root canal wall and to seal it.

Alternatively/additionally, according to the first aspect of the invention, the suction element may comprise an inner oscillator held in the suction tip and protruding from the front end thereof, the suction tip and the inner oscillator being connected at their rear end. If, during a cleaning process, vibrations are introduced into the suction element via a sonic handpiece to cause the suction tip to vibrate, the inner oscillator is also caused to vibrate accordingly and thus supports the cleaning action at its front end projecting from the suction tip. The inner oscillator is thus still effective, in particular, when the suction tip seals the tooth root canal and can no longer oscillate itself at this moment.

The inner oscillator can be made of a solid material. It is advisable for the inner oscillator to have a wire core. The wire can have a round cross-section, but can also be a braided wire. Suitable coatings include PTFE, PEEK, PE or PA.

Metal materials for the hollow inner oscillator may include nickel-titanium or nickel-titanium-copper alloys. In particular, the inner oscillator may be made of a heat-treated nickel-titanium alloy with a low pseudoelasticity and a relatively high pseudoplasticity relative thereto, preferably a martensitic FGL alloy. Similarly, the inner oscillator can be made of a heat-treated nickel-titanium-copper alloy with a low pseudoelasticity and a relatively high pseudoplasticity relative thereto.

Alternatively, the inner oscillator can be hollow, in which case the inner transducer is made in particular of plastic and/or metal and/or plastic-coated metal.

According to a preferred embodiment, the inner oscillator has an outer diameter of ≥0.1 mm and/or ≤0.5 mm.

In a further development of the invention, it is provided that the suction tip tapers towards its front end, the suction tip having a conically tapering sealing section, which is designed and dimensioned elastically in such a way that, when the suction tip is introduced into a dental root canal, it seals the latter in the region of the tooth root canal wall.

In one embodiment, the outer diameter of the conical sealing section of the suction tip is ≥0.4 mm, in particular ≤0.5 mm and/or ≥1.4 mm, in particular ≥1.2 mm.

According to one embodiment of the invention, it is provided that the suction element has a connecting part to which the line is connected and in which a suction channel section is formed, and that the suction tip and the inner oscillator are each fixed at their rear end to the connecting part and are thus connected to one another, wherein in particular the suction tip is plugged onto the connecting part and/or the inner oscillator engages in the suction channel section and is fixed there to the connecting part.

Furthermore, the task is solved in an extraction element of the aforementioned type according to the second aspect of the invention in that a connecting part is attached to or formed at the rear end of the extraction tip, which connecting part has connection means for connection to a vacuum device, and in that the connecting part has fastening means for releasably attaching the extraction element to a holder provided on or attached to a sonic handpiece.

The second aspect of the invention is thus based on the idea of designing the vacuum irrigation arrangement and, in particular, its suction element in such a way that it is possible, during the irrigation process, to set the irrigation liquid located in the root canal in vibration by means of sound vibrations which are generated by a commercially available sonic handpiece and introduced into the suction element. It has been shown that the cleaning effect can be significantly optimized by the combination of apical irrigation/vacuum suction according to the invention and the simultaneous sonic activation and associated turbulence of the irrigation liquid. Above all, the chemical effectiveness of the rinsing solution is increased due to the continuous fluid exchange and the swirling of the rinsing solution. Furthermore, all areas of the root canal (lateral canals, isthmus, etc.) are also reached and cleaned. Finally, clogging of the suction openings can be avoided and, consequently, reliable continuous suction of the rinsing solution can be ensured.

According to a preferred further embodiment of the invention, the sonic handpiece can in particular have a holder at its distal end, via which the suction element is detachably attached to the sonic handpiece. Alternatively, and according to a preferred embodiment, a holder is detachably mounted on the distal end of the sonic handpiece, via which the suction element is detachably attached to the sonic handpiece. In this case, coupling means corresponding to one another can be provided on the sonic handpiece and the holder, via which the holder is mounted on the sonic handpiece.

Expediently, the holder has fastening means, in particular at its distal end, which cooperate with corresponding fastening means of the suction element, in particular of the connecting part, in order to detachably attach the suction element to the sonic handpiece. According to one embodiment of this embodiment, the holder-side fastening means comprise a retaining ring with a through-opening through which the suction element passes. Preferably, the through opening is provided with an internal thread and the fastening means of the connecting part comprise a cylindrical section with an external thread, which is screwed into the through opening in order to detachably attach the suction element to the sonic handpiece in a simple manner.

Furthermore, the connecting part, which can be made of plastic or metal, for example, preferably has a plug-in section behind the cylindrical section that widens in a funnel-like manner towards the rear end of the connecting part. The conduit can be connected to the suction element, preferably to the connecting part and particularly preferably to the plug-in section of the connecting part, via a plug-in connection.

Connection means can be formed on the suction element, in particular the connection part of the suction element, and/or the line to create and/or secure the plug-in connection. For example, the connection means can be designed to create a hose/plug-in nipple connection between the line and the connection part.

According to a preferred embodiment according to the second aspect of the invention, it is provided that the suction tip is made of a stainless steel, or that the suction tip is made of a heat-treated nickel-titanium alloy, in particular a heat-treated nickel-titanium alloy having a low pseudoelasticity and a relatively high pseudoplasticity thereto, preferably of a martensitic FGL alloy, or that the suction tip consists of a heat-treated nickel-titanium-copper alloy, in particular a heat-treated nickel-titanium-copper alloy with a low pseudoelasticity and a relatively high pseudoplasticity thereto, or that the suction tip consists of plastic.

The front end of the suction tip can be closed to ensure easy suction of tissue from the patient's root canal and to prevent blocking due to edge closure with the tool body. An oval shape can also prevent such marginal locking.

Alternatively, the suction tip may also be formed according to the first aspect of the invention. Likewise, the suction tip and the inner oscillator can be fixed to the connecting part.

The suction tip can be tapered towards its front end so that it can be easily inserted into a dental root canal and/or the suction canal can be formed centrally in the suction tip. It can be designed in different lengths, conicities (tapers) and diameters to allow adaptation to the individually different tooth anatomies.

The suction channel can be open at its front end to form a suction opening. Likewise, the suction tip can have several suction openings which penetrate the wall of the suction tip starting from its outer lateral surface and open into the suction channel.

In this embodiment of the invention, the suction openings are conveniently located at the front end of the suction tip so that tissue located deep in the patient's root canal can also be loosened and suctioned off with the irrigation liquid, thus enabling a rinsing effect up to the apical region.

Likewise, several suction openings can be formed one behind the other in the longitudinal direction of the suction tip in each case in the lateral surface of the suction tip, whereby suction of irrigation liquid from the patient's root canal is made possible over a corresponding length.

Furthermore, several suction openings can be arranged offset from each other along the circumference of the suction tip, in particular evenly, so that irrigation liquid can be sucked out of the patient's root canal over the entire circumference of the suction tip.

In a preferred manner, a plurality of rows of suction openings, which are arranged one behind the other in the longitudinal direction of the suction tip and are aligned with one another, are formed in the circumferential surface of the suction tip, and the rows are distributed along the circumference of the suction tip, wherein, in particular, the suction openings of rows adjacent along the circumference are offset from one another in the longitudinal direction.

Either the usual dental suction unit can serve as the vacuum device. To improve the suction effect, a vacuum pump with a vacuum of 400 to 1000 mmHg and more is used.

Furthermore, in order to solve the task according to the invention, a vacuum irrigation arrangement of the type mentioned above is specified, in which a valve device is provided between the vacuum device and the suction element, which is designed to alternately open and close the line between the vacuum device and the suction element with such a frequency that longitudinal oscillations are generated in the suction channel of the suction tip.

These longitudinal oscillations generate a repeated rise and fall of a negative pressure transmitted to the suction channel via the vacuum device, so that the irrigation liquid located in a dental root canal is excited. Thus, an effect similar to that produced by the repeated sealing/opening of the tooth root canal according to the first aspect of the invention is achieved, namely that shock waves are generated by which air bubbles in the irrigation solution collapse and expand again.

Finally, according to the invention, a holder is proposed which serves to connect a suction element (according to the invention) to a commercially available sonic handpiece. This comprises an elongated holder body which has coupling means at one end for connection to a sound handpiece and fastening means at its other end for detachable attachment of an extraction element, the holder being designed to transmit sonic vibrations from a sonic handpiece to the extraction element.

Advantageously, the fastening means have a through opening through which the suction element can pass. Preferably, the through opening is provided with an internal thread so that the suction element can be screwed into the through opening and thus connected to the sonic handpiece.

BRIEF DESCRIPTION OF THE DRAWINGS

With respect to further embodiments of the present invention, reference is made to the following embodiments with reference to the accompanying drawings. Shown in the drawings.

DETAILED DESCRIPTION OF THE PREFERRED EMBODIMENT(S)

Figure 1:
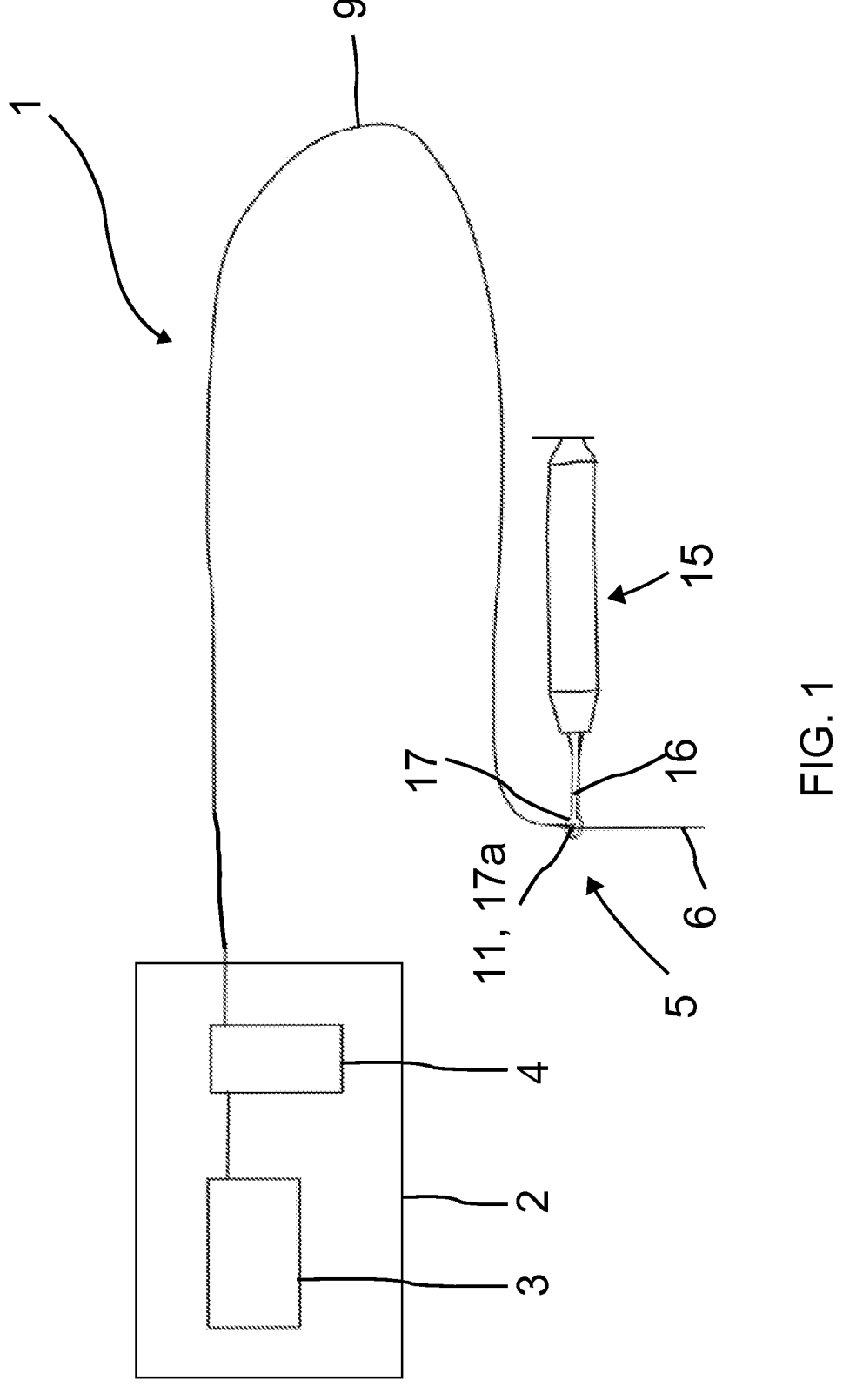
FIG. 1 a schematic representation of an embodiment of the dental root canal irrigation arrangement according to the invention, FIG. 2 a sectional view of the holder and a suction element for the dental root canal irrigation arrangement of FIG. 1, FIG. 3 a sectional view of the front end portion of the suction tip of the suction element of FIG. 2, FIG. 4 another sectional view of the front end portion of the suction tip of the suction element of FIG. 2, FIG. 5 a schematic representation of a further embodiment of the vacuum irrigation arrangement according to the invention, FIG. 6 a schematic representation of an interaction of both embodiments of the vacuum irrigation arrangement according to the invention, FIG. 7 a sonic handpiece with a suction element held therein for a payer root canal irrigation arrangement according to a further embodiment of the present invention, FIG. 8 a front view of the arrangement shown in FIG. 7, FIG. 9 the arrangement from FIG. 8 in section A-A, FIG. 10 an enlarged view of the arrangement in FIG. 7 without the sonic handpiece, FIG. 11 a sectional view of the arrangement shown in FIG. 10 along line B-B, FIG. 12 an enlarged and partially transparent view of the suction element from FIGS. 7 to 11, and FIG. 13 an enlarged top view of the suction element shown in FIG. 12.

FIG. 1 shows an embodiment of a vacuum irrigation arrangement 1 for cleaning a dental root canal of a patient according to the present invention. The vacuum irrigation arrangement 1 comprises a vacuum device 2, which can be designed as a conventional dental suction system, but here has a vacuum pump 3 with a vacuum of 400 to 1000 mmHg and a vacuum and collection container 4, and a suction element 5 with an elongated suction tip 6 positioned at its front end, which is made of a flexible material.

Figure 2:
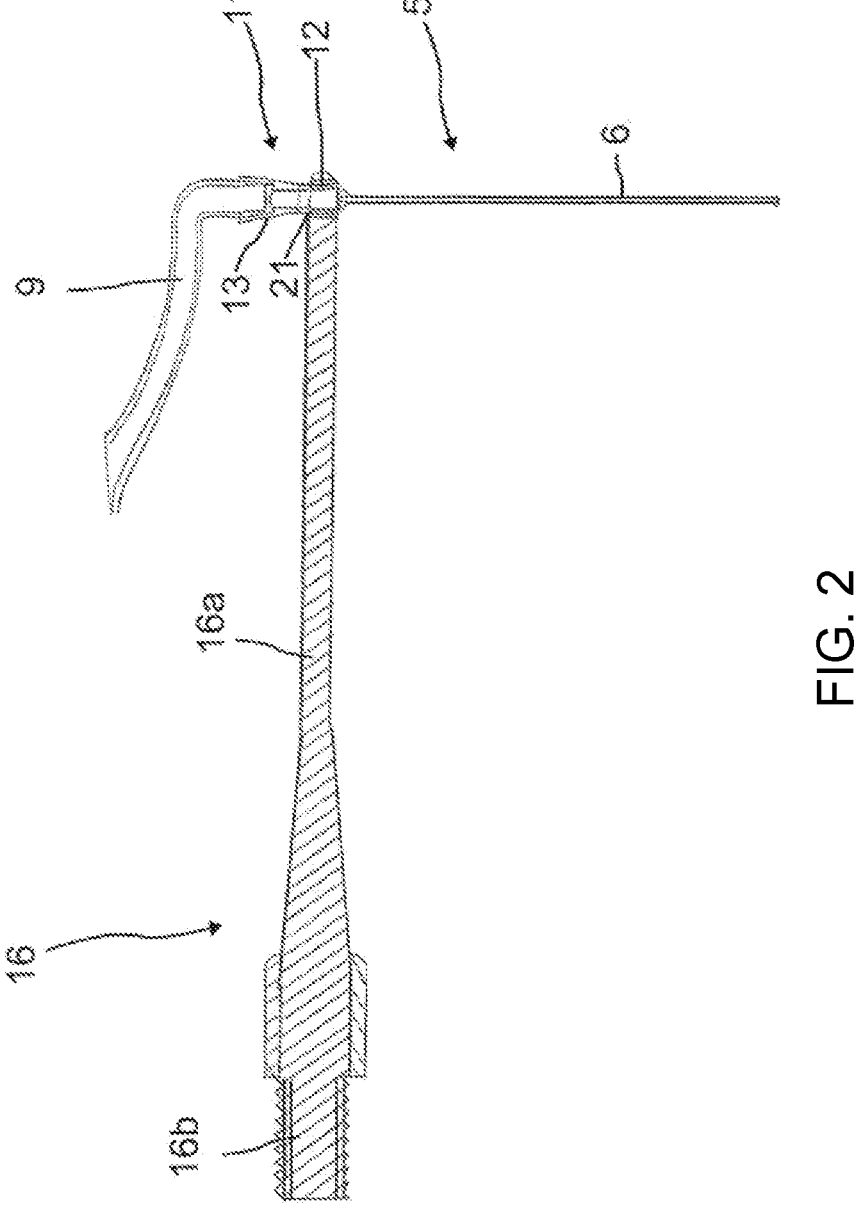

The suction tip 6 may be formed in various ways. In the embodiment example shown in FIGS. 2 to 4, the suction tip 6 is made of a heat-treated nickel-titanium alloy, namely a martensitic FGL alloy with a low pseudoelasticity and a higher pseudoplasticity relative thereto.

Figure 3:
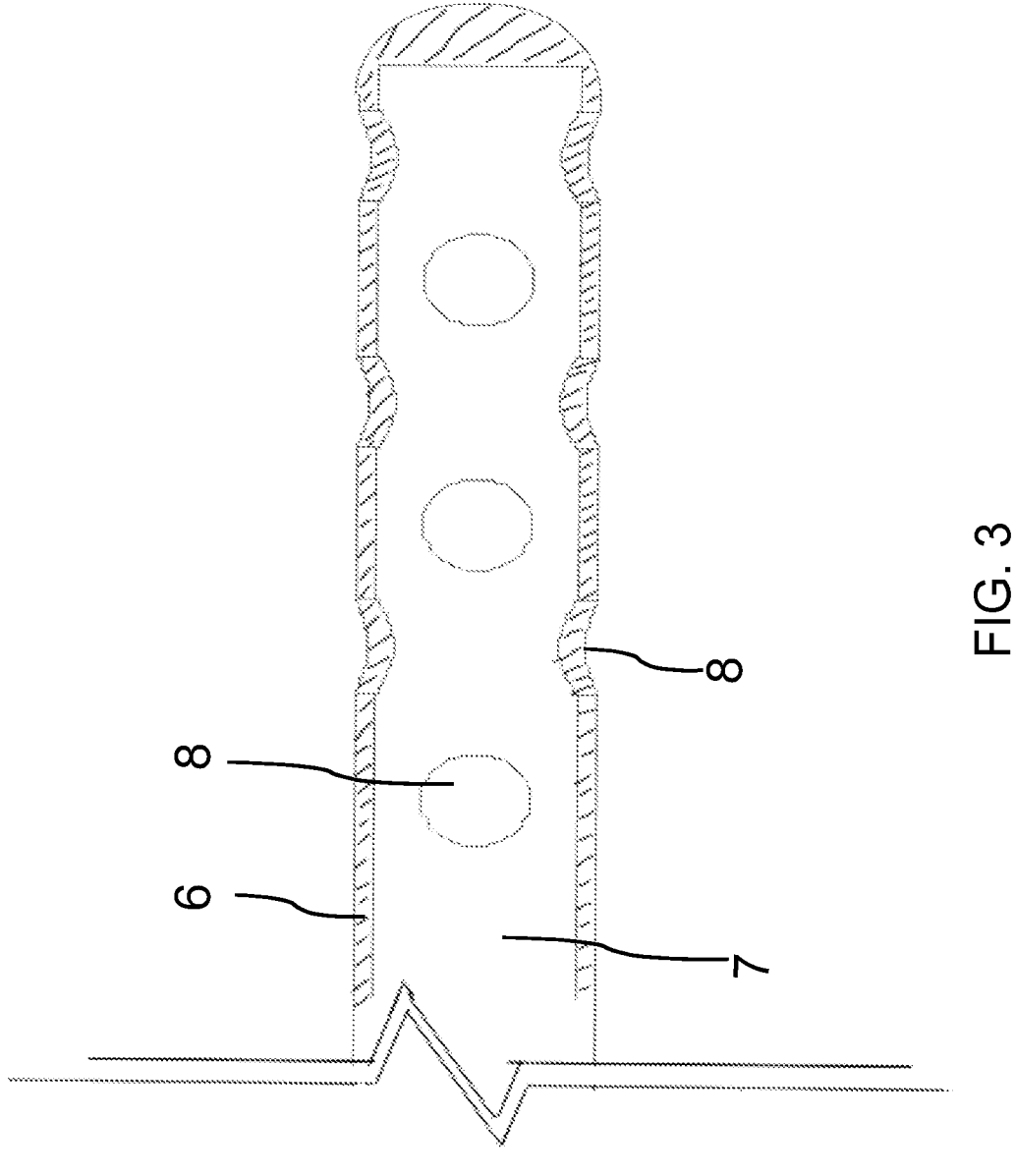
Figure 4:
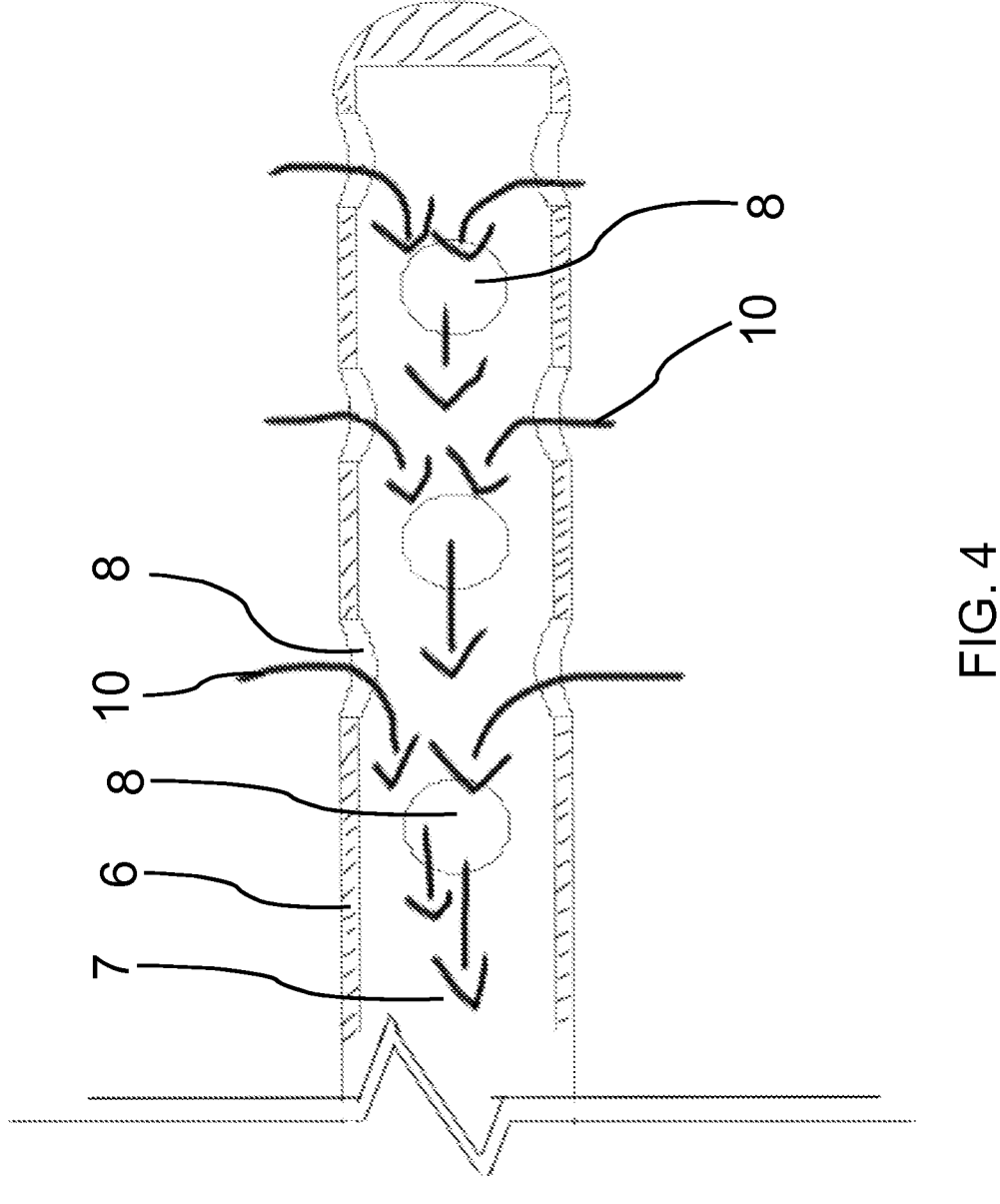

As can be seen from FIGS. 3 and 4, a suction channel 7 is formed centrally in the suction element 5, extending from the rear end of the suction element 5 to the front closed end of the suction tip 6.

Furthermore, the suction tip 6 has several suction openings 8 which penetrate the wall of the suction tip 6 starting from its outer lateral surface and open into the suction channel 7. In the illustrated embodiment example, four rows of three suction openings 8 each are formed, one behind the other in the longitudinal direction of the suction tip 6 and aligned with each other. The rows are evenly distributed along the circumference of the suction tip 6, i.e. positioned with 90° offset to each other. The suction openings 8 in the rows are arranged equidistantly, with the suction openings 8 of rows adjacent along the circumference being offset from one another in the longitudinal direction by half a hole spacing.

The suction element 5 is connected at its rear end via a conduit 9 to the vacuum device 2 so that irrigation liquid introduced into a dental root canal can be sucked by means of a vacuum generated by the vacuum device 2 via the suction openings 8 into the suction channel 7 and via this to the vacuum device 2. To illustrate this, the flow path along which the irrigation liquid is drawn off is shown in FIG. 4 by means of arrows 10.

Specifically, the suction element 5 has a connecting part 11 made of a plastic material fixedly attached to the rear end of the suction tip 6, which comprises a cylindrical section 12 with an external thread at its front end 11 and centrally has a suction channel section 7*a*.

At its rear end, the connecting part 11 is connected to the conduit 9 via a plug-in connection. To make and/or secure the plug-in connection, the connecting part 11 has a plug-in section 13 which widens like a funnel and has a circumferential bead 14 which, when the plug-in connection is made, engages with the line 9 in the manner of a hose plug-in nipple connection.

The vacuum irrigation arrangement 1 further comprises a sonic device in the form of a conventional sonic handpiece 15, which carries coupling means at one end thereof, which are designed in a manufacturer-specific manner and serve for the detachable attachment of attachments. According to the invention, as an attachment, a holder 16 or coupling element is attached to the sonic handpiece 15, which is designed and serves to fix the suction element 5 to the sonic handpiece 15, so that vibrations/vibrations generated by the sonic handpiece 15 can be introduced the suction element 5 to cause the suction tip 6 to vibrate.

The holder 16 comprises a holder body 16*a* carrying at one end thereof coupling means 16*b* for attaching the holder 16 to the sonic handpiece 15, and having at the opposite end thereof fastening means for fixing the suction element 5 to the holder 16*b*. The fastening means comprise a retaining ring 17 having a through opening 17*a* which is provided with an internal thread. The through opening 17*a* is penetrated by the suction element 5, which is screwed into the through opening 17*a* via the external thread on the cylindrical section 12.

Figure 5:
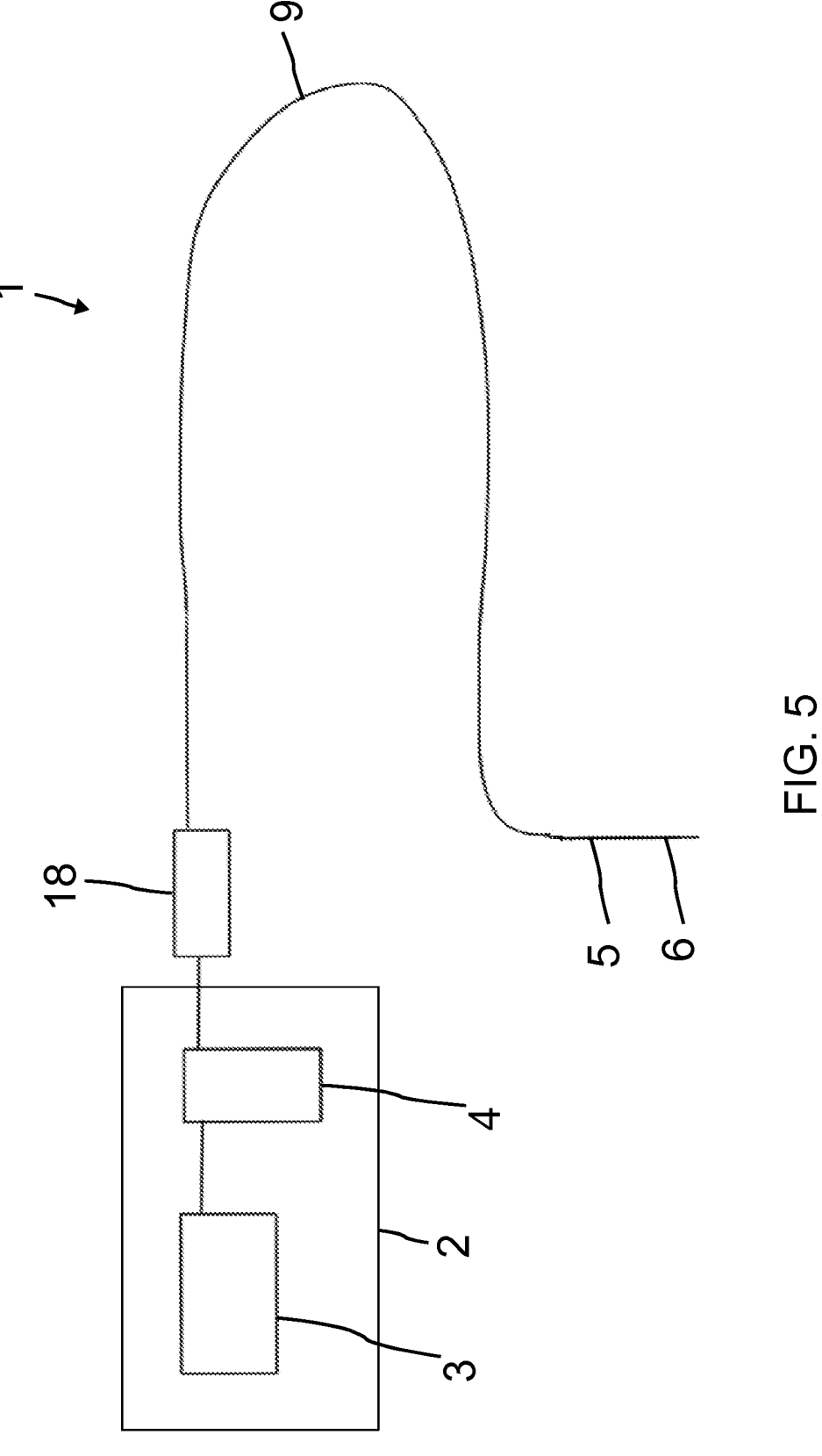
Figure 6:
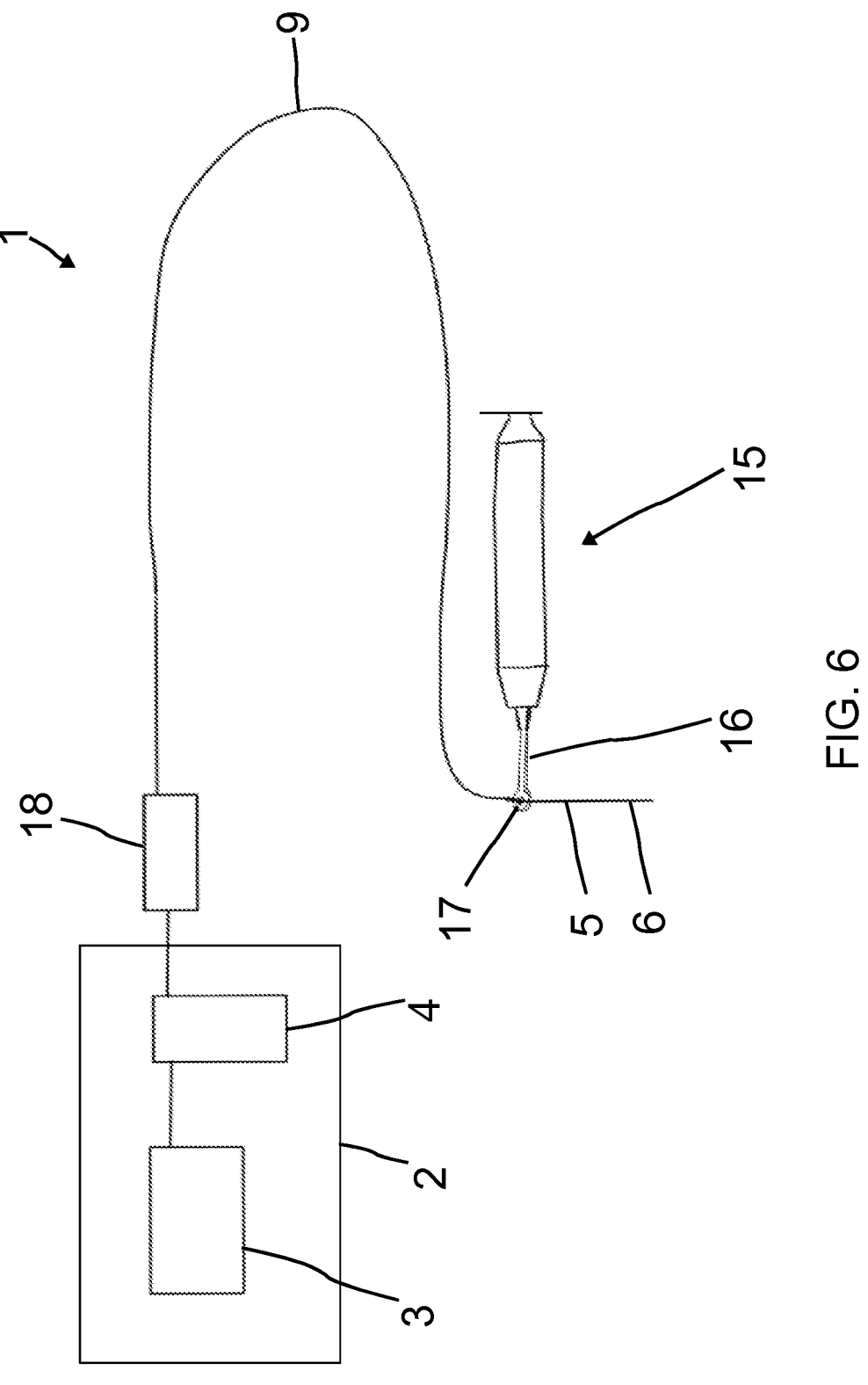
Figure 7:
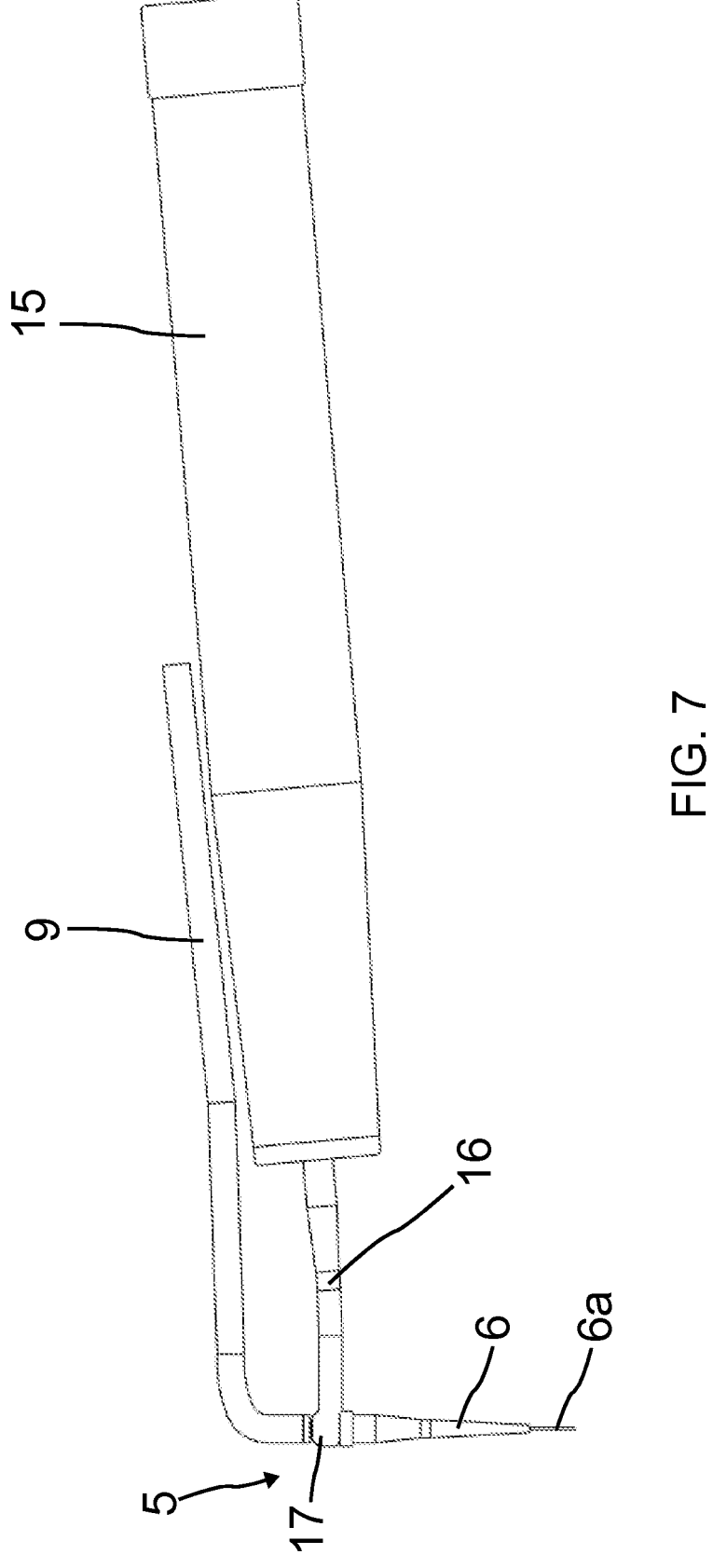
Figure 8:
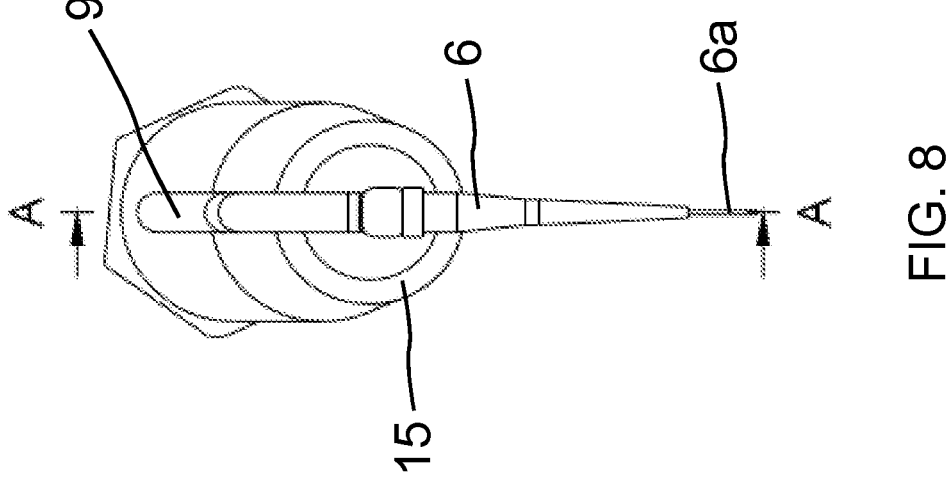
Figure 9:
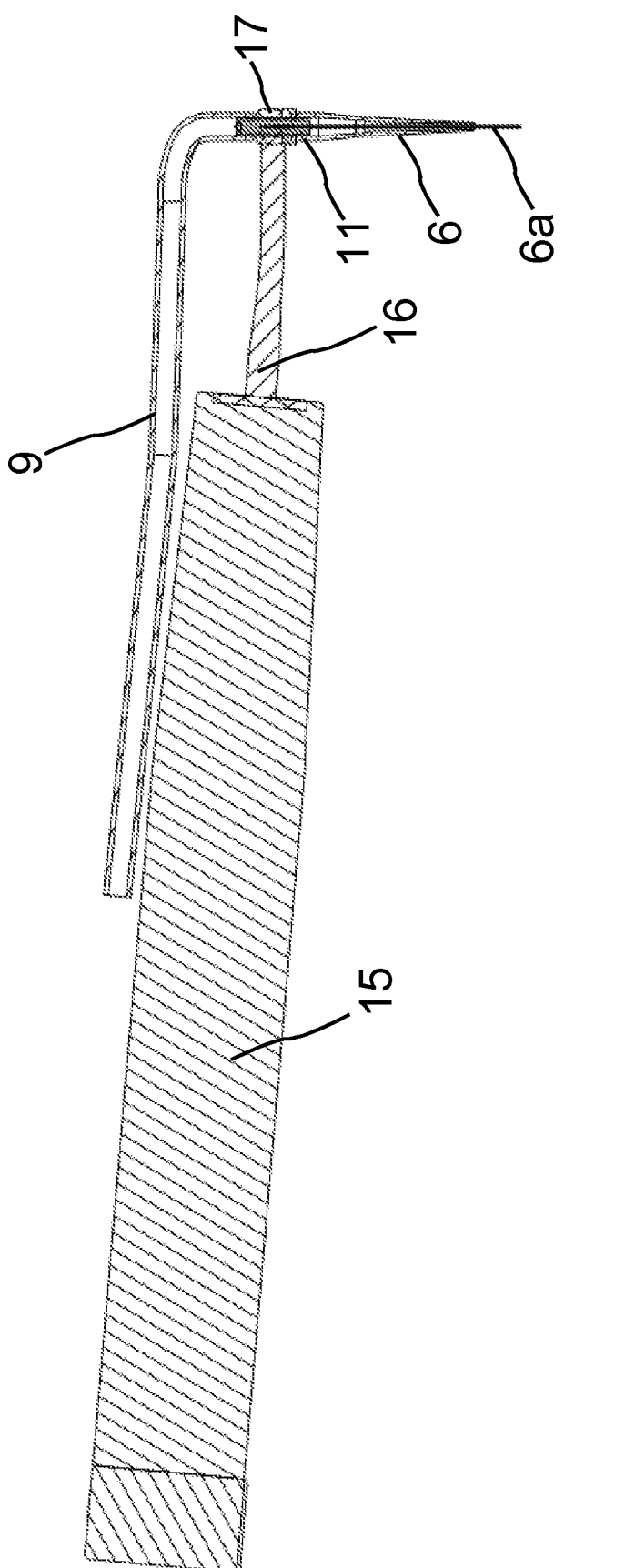
Figure 10:
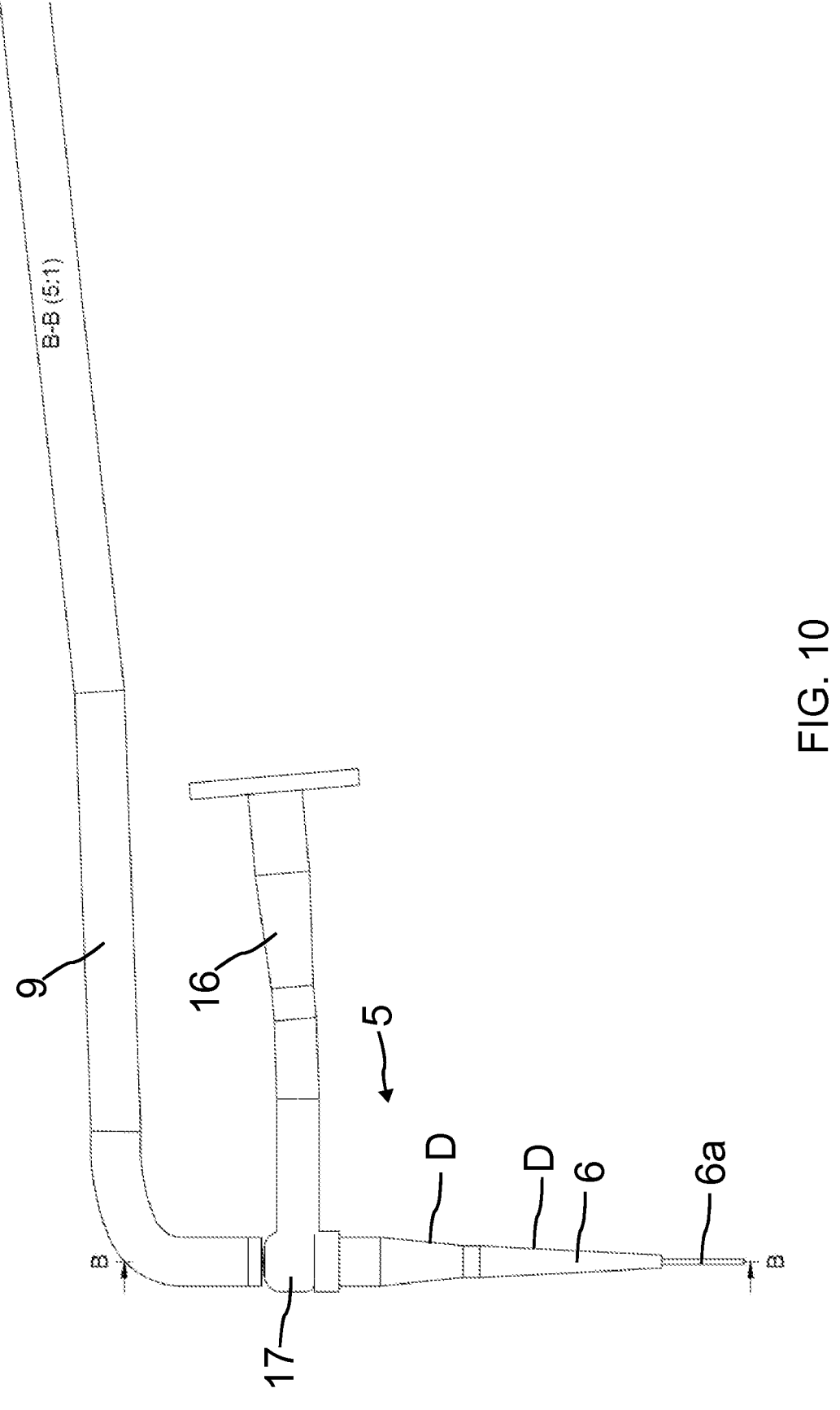

FIG. 5 shows a further embodiment of a vacuum irrigation arrangement 1 according to the present invention. This differs from the embodiment shown in FIGS. 1 to 4 in that it has a valve device 18 along the conduit 9, between the suction element 5 and the vacuum device 2, and the sonic handpiece 15 is missing.

The valve device 18 is designed to alternately open and close the line 9 with such a frequency that longitudinal oscillations are generated in the suction channel 7 of the suction tip 6. These cause a repeated rise and fall of the negative pressure transmitted to the suction channel 7 via the vacuum device 2, which stimulates the rinsing liquid in the dental root canal.

Thus, the sonic handpiece 15 and the valve device 18 can be used selectively or together to cause the suction tip 6 to vibrate.

FIGS. 6 to 13 show an alternative design of a sonic handpiece 15 with a holder 16 and a suction element 5 for the dental root canal irrigation arrangement from FIG. 1. As can be seen in particular in FIGS. 9, 11 and 12, the suction element 5 comprises an elongated suction tip 6, which is made of a flexible plastic material and is hollow in the manner of a suction cannula. As can be readily seen in the figures, the suction tip 6 has an outer contour which tapers from the rear end of the suction tip 6 towards its front end. The rear, open end of the suction tip 6 is attached to a cylindrical connecting part 11 and fixed to the latter. In the manner already explained, the connecting part 11 has an external thread via which it is screwed into the holder 16, which is fixed to the sonic handpiece 15, so that vibrations/vibrations generated by the sonic handpiece 15 can be introduced into the suction element 5. Thereby, a suction channel 7 is centrally formed in the suction element 5, which extends from the rear end of the connecting part 11 to the front open end of the suction tip 6, wherein a suction channel section 7*a* is formed in the connecting part 11. The line 9 leading to the vacuum device 2 is connected to the connecting part 11.

The suction element 5 additionally has an inner oscillator 6*a*, which is fixed in the suction channel section 7*a* of the connecting element, extends through the suction tip 6 and protrudes from its front end. The suction tip 6 and the inner oscillator 6*a* are connected to each other via the connecting element 11.

Figure 11:
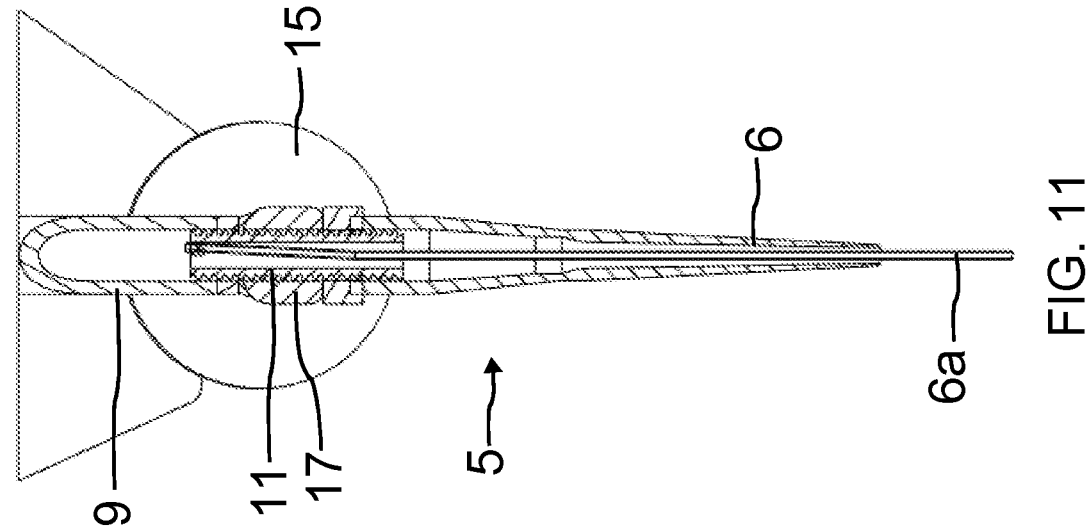
Figure 12:
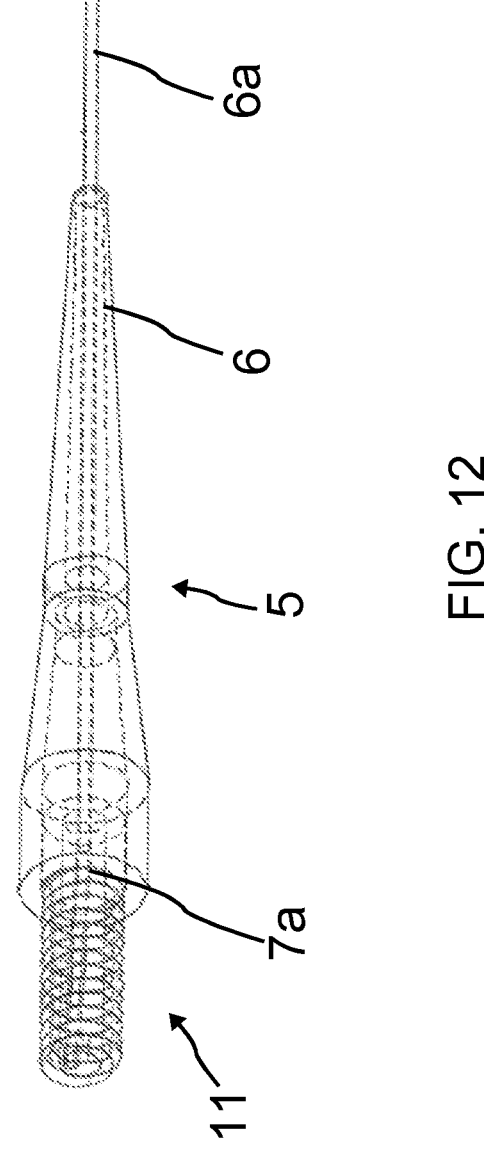
Figure 13:
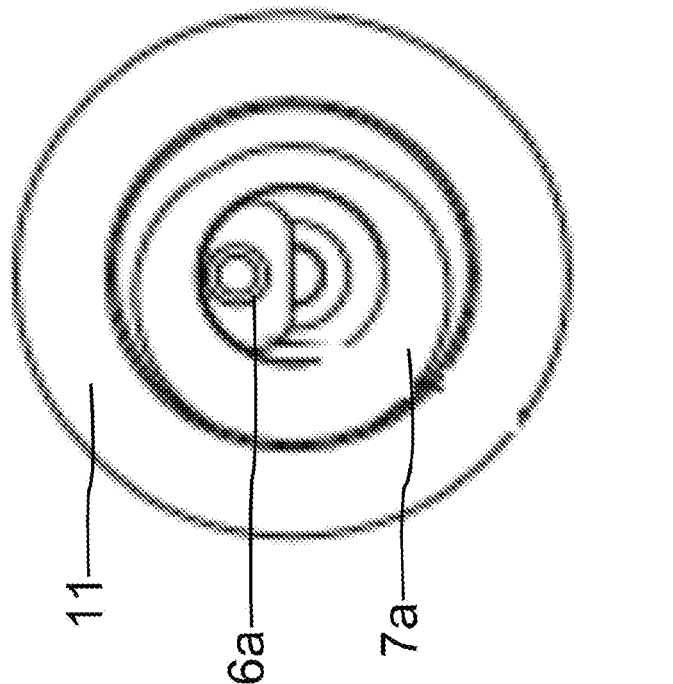

In the embodiment shown in FIG. 11, the inner oscillator 6 is made of a solid material, in this case a wire coated with plastic. Alternatively, it is possible to make the inner oscillator 6*a* hollow, in which case it is preferably made of a plastic material.

The outer contour of the suction tip 6 is selected so that when the suction tip 6 is inserted into a tooth root canal, it comes into contact with the dental root canal wall from a certain insertion depth and thus seals the dental root canal between the dental root canal wall and the suction tip. As a result of this sealing, a negative pressure is created in the dental root canal during dental root canal treatment due to the effect of the vacuum device 2, which abruptly drops again when the suction element 5 is pulled out of the tooth root canal again. By alternately inserting/extracting the suction tip 6 into/from the tooth root canal, shock waves can thus be generated alternately, whereby the air bubbles contained in the dental root canal and the irrigation solution therein expand and collapse at the same time, thereby supporting the cleaning of the dental root canal.

When the suction tip 6 closes the dental root canal, this simultaneously results in the fact that vibrations introduced into the suction element 5 via the sonic handpiece 15 can no longer or hardly cause the suction tip 6 to vibrate. The internal transducer 6*a*, on the other hand, continues to vibrate so that the rinsing liquid continues to be excited by the vibrating front end of the internal transducer 6*a* protruding from the suction tip 6.

As shown in the figures, the suction tip 6 has a number of conical sections on the outside, which are formed and dimensioned as a sealing section D to sealingly close the tooth root canal as described.

The invention claimed is:

1. A dental root canal irrigation arrangement for cleaning dental root canals of a patient, comprising:

a vacuum device (2);

a suction element (5) with an elongated suction tip (6), which is at least partially made of a flexible material and is positioned at a front end of the suction element (5); and a sonic device having a sonic handpiece (15), wherein a suction channel (7) is formed in the suction element (5), which extends from a rear end of the suction element (5) in the direction of its front end into the suction tip (6), wherein the suction tip (6) has at least one suction opening (8) which opens into the suction channel (7), wherein the rear end of the suction element (5) is connected to the vacuum device (2) via a conduit (9), so that a rinsing liquid with tissue residues and/or bacteria contained therein can be sucked by a vacuum generated by the vacuum device (2) via the at least one suction opening (8) into the suction channel (7) and via the latter to the vacuum device (2), wherein the suction element (5) has an inner oscillator (6*a*) extending through the suction tip (6) and protruding out of the front end thereof, wherein the inner oscillator (6*a*) is hollow, wherein the suction tip (6) is configured elastically and dimensionally to be introduced into a dental root canal, wherein the suction element (5) is detachably attached to a distal end of the sonic headpiece (15) so that sonic vibrations generated by the sonic headpiece (15) may be introduced into the suction element (5) to cause the suction tip (6) to vibrate, wherein the suction tip (6) and the inner oscillator (6*a*) are connected to one another at their rear, wherein the suction element (5) has a connecting part (11) that comprises an attachment device for releasably attaching the suction tip (6) at the sonic handpiece (15), wherein the conduit (9) is connected to the connecting part (11) and a suction canal section (7*a*) is formed in the connecting part (11), wherein the suction tip (6) and the inner oscillator are (6*a*) each fixed at their rear to the connecting part (11) and are connected to one another, wherein the inner oscillator (6*a*) engages the suction channel section (7*a*) and is fixed there to the connecting part (11).

2. The dental root canal irrigation arrangement according to claim 1, wherein the inner oscillator (6*a*) consists of plastic, and wherein the inner oscillator (6*a*) has an outer diameter of >0.1 mm and/or <0.5 mm.

3. The dental root canal irrigation arrangement according to claim 1, wherein the suction tip (6) tapers towards its front end, wherein the suction tip (6) has a conically tapering sealing section (D) which is formed elastically and dimensionally in such a way that, when the suction tip (6) is introduced into the dental root canal, it seals the latter in the region of a dental root canal wall, and wherein outer diameters of the conically tapered sealing section (D) of the suction (6) is ≥0.4 mm and/or ≤1.4 mm.

4. The dental root canal irrigation arrangement according to claim 1, wherein the suction tip (6) is plugged onto the connecting part (11).

5. A suction element for sucking irrigation liquid from a dental root canal of a patient to be cleaned, comprising an elongated suction tip (6) which consists at least partially of a flexible material and is positioned at a front end of the suction element (5), wherein the suction element (5) has a suction channel (7) which, starting from a rear end of the suction element (5), extends in the direction of the front end thereof into the suction tip (6), and wherein the suction tip (6) has at least one suction opening (8) which opens into the suction channel (7), wherein the suction element (5) has an inner oscillator (6*a*) extending through the suction tip (6) and projecting out of the front end of the suction tip (6), and wherein the inner oscillator (6*a*) is hollow, wherein the suction tip (6) is configured elastically and dimensionally in such a way to be insertable into a dental root canal, wherein the suction tip (6) and the inner oscillator (6*a*) are connected to one another at rear ends thereof, wherein the suction element (5) has a connecting part (11) that comprises an attachment device for releasably attaching the suction tip at a sonic handpiece (15), wherein a conduit (9) is connectable to the connecting part (11) and a suction canal section (7*a*) is formed in the connecting part (11), wherein the suction tip (6) and the inner oscillator (6*a*) are each fixed at the rear ends thereof to the connecting part (11) and are thereby connected to one another, and wherein the inner oscillator (6*a*) engages a suction channel section (7*a*) and is fixed there to the connecting part (11).

6. The suction element according to claim 5, wherein the inner oscillator (6*a*) consists of plastic, and wherein the inner oscillator (6*a*) has an outer diameter of >0.1 mm and/or <0.5 mm.

7. The suction element according to claim 5, wherein the inner oscillator (6*a*) has an outer diameter of ≥0.1 mm and/or ≤0.5 mm.

8. The suction element according to claim 5, wherein the suction tip (6) tapers towards the front end thereof and has a conically tapering sealing section (D), which is elastically formed and dimensioned in such a way that, when the suction tip (6) is introduced into a root canal, it seals the latter, and wherein the outer diameters of the conical sealing section (D) of the suction tip are ≥0.4 mm and/or ≤1.4 mm.

9. The suction element according to claim 5, wherein the suction tip (6) has a plurality of suction openings (8) which penetrate a wall of the suction tip (6) starting from its outer lateral surface and open into the suction channel (7).

10. The suction element according to claim 9, wherein the suction openings (8) are located at the front end of the suction tip (6), and/or wherein in each case a plurality of suction openings (8) are formed one behind the other in the longitudinal direction of the suction tip (6) in the lateral surface of the suction tip (6), and/or wherein in each case a plurality of suction openings (8) are distributed along the circumference of the suction tip (6), are formed in the circumferential surface of the suction tip (6), and/or wherein a plurality of rows of suction openings (8) lying one behind the other in the longitudinal direction of the suction tip (6) and aligned with one another are formed in the circumferential surface of the suction tip (6), and the rows are distributed along the circumference of the suction tip (6).

11. The dental root canal irrigation arrangement according to claim 1, wherein the inner oscillator (6*a*) consists of metal, and wherein the inner oscillator (6*a*) has an outer diameter of >0.1 mm and/or <0.5 mm.

12. The dental root canal irrigation arrangement according to claim 1, wherein the inner oscillator (6*a*) consists of plastic-coated metal, and wherein the inner oscillator (6*a*) has an outer diameter of >0.1 mm and/or <0.5 mm.

13. The suction element according to claim 5, wherein the inner oscillator (6*a*) consists of metal, and wherein the inner oscillator (6*a*) has an outer diameter of >0.1 mm and/or <0.5 mm.

14. The suction element according to claim 5, wherein the inner oscillator (6*a*) consists of plastic-coated metal, and wherein the inner oscillator (6*a*) has an outer diameter of >0.1 mm and/or <0.5 mm.

* * * * *